US011923534B2

(12) United States Patent
Yamamoto et al.

(10) Patent No.: US 11,923,534 B2
(45) Date of Patent: Mar. 5, 2024

(54) NONAQUEOUS ELECTROLYTE SECONDARY BATTERY INCLUDING A POSITIVE ELECTRODE ACTIVE SUBSTANCE CONTAINING A LITHIUM COMPOSITE OXIDE POROUS PARTICLE HAVING VOIDS

(71) Applicants: TOYOTA JIDOSHA KABUSHIKI KAISHA, Toyota (JP); SUMITOMO METAL MINING CO., LTD., Tokyo (JP)

(72) Inventors: Yuji Yamamoto, Toyota (JP); Momoko Procter, Seto (JP); Yoshinari Makimura, Nisshin (JP); Tetsutaro Hayashi, Niihama (JP); Willy Shun Kai Bong, Niihama (JP)

(73) Assignees: TOYOTA JIDOSHA KABUSHIKI KAISHA, Toyota (JP); SUMITOMO METAL MINING CO., LTD., Tokyo (JP)

( * ) Notice: Subject to any disclaimer, the term of this patent is extended or adjusted under 35 U.S.C. 154(b) by 308 days.

(21) Appl. No.: 16/925,978

(22) Filed: Jul. 10, 2020

(65) Prior Publication Data

US 2021/0020924 A1 Jan. 21, 2021

(30) Foreign Application Priority Data

Jul. 18, 2019 (JP) .................. 2019-133131

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/131* (2013.01); *H01M 4/485* (2013.01);
(Continued)

(58) Field of Classification Search
CPC .......... H01M 4/36–628; H01M 10/052–0525; H01M 4/131; H01M 4/366; H01M 4/485;
(Continued)

(56) References Cited

U.S. PATENT DOCUMENTS

2010/0209771 A1* 8/2010 Shizuka .............. H01M 4/5815
429/231.95
2018/0123118 A1* 5/2018 Furuichi ............ H01M 4/0471
(Continued)

FOREIGN PATENT DOCUMENTS

JP 2016-154143 A 8/2016
JP 2016-225277 A 12/2016
(Continued)

OTHER PUBLICATIONS

Fu et al., "Electrochemical Properties of the LiNi0.6Co0.2Mn0.2O2 Cathode Material Modified by Lithium Tungstate under High Voltage," ACS Applied Materials & Interfaces 2018, 10, p. 19704-19711 DOI: 10.1021/acsami.8b04167. (Year: 2018).*

*Primary Examiner* — Allison Bourke
*Assistant Examiner* — Bethany C Garcia
(74) *Attorney, Agent, or Firm* — Oliff PLC

(57) ABSTRACT

A non-aqueous electrolyte secondary battery which is obtained using a lithium composite oxide having a layered structure and coated with a tungsten-containing compound in a positive electrode active substance, and which has a low initial resistance, and in which an increase in resistance following repeated charging and discharging is suppressed. The non-aqueous electrolyte secondary battery includes a positive electrode, a negative electrode and a non-aqueous electrolyte. The positive electrode includes a positive electrode active substance layer containing a lithium composite oxide having a layered structure. The lithium composite oxide includes a porous particle having a void ratio of not less than 20% but not more than 50%. The porous particle
(Continued)

contains two or more voids having diameters that are at least 10% of the particle diameter of the porous particle. The surface of the porous particle is provided with a coating containing tungsten oxide and lithium tungstate.

4 Claims, 3 Drawing Sheets

(51) Int. Cl.
  *H01M 4/131* (2010.01)
  *H01M 4/485* (2010.01)
(52) U.S. Cl.
  CPC .................... *H01M 2004/021* (2013.01); *H01M 2004/028* (2013.01); *H01M 2220/20* (2013.01)
(58) Field of Classification Search
  CPC ... H01M 2004/021–028; H01M 4/362; H01M 4/525; H01M 4/505; H01M 4/1391; H01M 4/354; H01M 4/0471; H01M 4/0404; H01M 4/134; H01M 4/0409; H01M 4/0435; H01M 4/139; H01M 4/624; H01M 4/621; H01M 4/136; H01M 4/58; H01M 4/663; H01M 4/04; H01M 4/0411; H01M 4/48; H01M 4/521; H01M 4/5815; H01M 4/5825; H01M 4/625; H01M 4/0433; H01M 4/13; H01M 4/0416; H01M 4/38; H01M 4/587; H01M 4/661; H01M 4/8882; H01M 10/0562; H01M 10/0427; H01M 10/0567; H01M 10/0569; H01M 10/058; H01M 10/4235; H01M 10/44; H01M 2004/029; H01M 50/103; H01M 50/107; H01M 50/417; H01M 50/491; C01G 53/00–50; C01G 53/42; C01G 53/006; C01G 53/04; C01G 53/54; C01G 53/40; C01G 41/00; C01G 41/006; C01G 41/02; C01G 45/02; Y02E 60/10; C01P 2006/14–17; C01P 2002/52; C01P 2004/61; C01P 2004/03; C01P 2004/50; C01P 2004/54; C01P 2004/84; C01P 2004/64; C01P 2004/62; C01P 2004/51; C01P 2004/80; C01P 2004/45; C01P 2004/85; C01P 2004/86; C01P 2004/10; C01P 2004/32; C01P 2004/34; C01P 2004/88; C01P 2004/04; C01P 2006/12; C01P 2006/40; C01P 2006/11; C01P 2006/10; C01P 2006/19; C01P 2006/82; Y02P 70/50; B29B 7/005; C01D 15/02; H01G 11/06; H01G 11/24; H01G 11/46; H01G 11/50; H01G 11/86; H01G 9/00; B82Y 30/00; Y02T 10/70

See application file for complete search history.

(56) References Cited

U.S. PATENT DOCUMENTS

2018/0366727 A1    12/2018  Toyama et al.
2019/0036112 A1    1/2019   Aida et al.

FOREIGN PATENT DOCUMENTS

| | | |
|---|---|---|
| JP | 2017-016753 A | 1/2017 |
| JP | 2018-022568 A | 2/2018 |
| JP | 2018-095505 A | 6/2018 |
| JP | 2018-104273 A | 7/2018 |
| JP | 2018-104274 A | 7/2018 |
| JP | 2018-104275 A | 7/2018 |
| JP | 2018-104276 A | 7/2018 |
| JP | 2018-186065 A | 11/2018 |
| JP | 2019-119661 A | 7/2019 |
| WO | 2017/073238 A1 | 5/2017 |
| WO | 2017/208894 A1 | 12/2017 |
| WO | 2018/003477 A1 | 1/2018 |

* cited by examiner

NONAQUEOUS ELECTROLYTE SECONDARY BATTERY INCLUDING A POSITIVE ELECTRODE ACTIVE SUBSTANCE CONTAINING A LITHIUM COMPOSITE OXIDE POROUS PARTICLE HAVING VOIDS

BACKGROUND OF THE INVENTION

1. Field of the Invention

The present disclosure relates to a nonaqueous electrolyte secondary battery. This application claims priority based on Japanese Patent Application No. 2019-133131 filed Jul. 18, 2019, the contents of which are incorporated herein in their entirety by reference.

2. Description of the Related Art

In recent years, nonaqueous electrolyte secondary batteries such as lithium ion secondary batteries are suitably used as portable power sources for personal computers, portable terminals, and the like as well as vehicle-driving power sources for electric vehicles (EVs), hybrid vehicles (HVs), plug-in hybrid vehicles (PHVs), and the like.

Nonaqueous electrolyte secondary batteries generally use a positive electrode active material that is capable of storing and releasing the ion that functions as the charge carrier. Lithium composite oxides having a layered structure are an example of a positive electrode active material (refer, for example, to Japanese Patent Application Laid-open No. 2016-225277). It is stated in Japanese Patent Application Laid-open No. 2016-225277 that the capacity and output of nonaqueous electrolyte secondary batteries can be increased by coating the surface of the lithium composite oxide having a layered structure with lithium tungstate.

SUMMARY OF THE INVENTION

However, as a result of intensive investigations, the present inventors have found that there is room for improvement in the aforementioned prior art with regard to reducing the resistance of nonaqueous electrolyte secondary batteries.

An object of the present disclosure is therefore to provide a nonaqueous electrolyte secondary battery that uses, as a positive electrode active material, a lithium composite oxide having a layered structure and coated with lithium tungstate, and that has a low resistance.

The herein disclosed nonaqueous electrolyte secondary battery includes a positive electrode, a negative electrode, and a nonaqueous electrolyte. The positive electrode includes a positive electrode active material layer. The positive electrode active material layer contains a lithium composite oxide having a layered structure as a positive electrode active material. The lithium composite oxide is in a form of porous particles. Each of the porous particles has at least two voids each of which has a percentage of void area with respect to an area occupied by each of the particles in a cross-sectional view thereof of at least 1%. Each of the porous particles has a void that connects an interior of each of the particles to a surface thereof and has an opening. The opening has an opening diameter of at least 100 nm. Each of the porous particles is provided with a coating of lithium tungstate on their surface.

This constitution provides a nonaqueous electrolyte secondary battery that uses, as a positive electrode active material, a lithium composite oxide having a layered structure and coated with lithium tungstate, and that has a low resistance.

In a desired aspect of the herein disclosed nonaqueous electrolyte secondary battery, the porous particles have an average void ratio of at least 10% and not more than 50%, and a percentage of particles having a void ratio of at least 10% and not more than 50% in the porous particles is at least 80%.

This constitution provides a nonaqueous electrolyte secondary battery that has an even lower resistance.

In a desired aspect of the herein disclosed nonaqueous electrolyte secondary battery, the lithium tungstate coating is granular and the granular coating has an average particle diameter smaller than an average opening diameter of the opening of the void in the porous particles.

This constitution provides a nonaqueous electrolyte secondary battery with an even lower resistance.

DESCRIPTION OF THE PREFERRED EMBODIMENTS

Embodiments according to the present disclosure are described in the following with reference to the figures. Matters required for the execution of the present disclosure but not particularly described in this Specification (for example, the general constitution of a nonaqueous electrolyte secondary battery and production process therefor that are not characteristic features of the present disclosure) can be understood as design matters for the individual skilled in the art based on the conventional art in the pertinent field. The present disclosure can be implemented based on the contents disclosed in this Specification and the common general technical knowledge in the pertinent field. In the figures referenced in the following, members and positions that exercise the same function are assigned the same reference sign in the description. The dimensional relationships (length, width, thickness, and so forth) in the individual figures do not reflect actual dimensional relationships.

In the Specification, a "secondary battery" is a term which describes repetitively chargeable and dischargeable power storage devices in general and which encompasses so-called storage batteries such as a lithium-ion secondary battery and storage elements such as an electrical double layer capacitor.

The present disclosure is described in detail in the following using as an example a flat rectangular lithium ion secondary battery having a flat wound electrode assembly and a flat battery case; however, this should not be construed to mean that the present disclosure is limited to or by the description in the instant embodiments.

Figure 1:
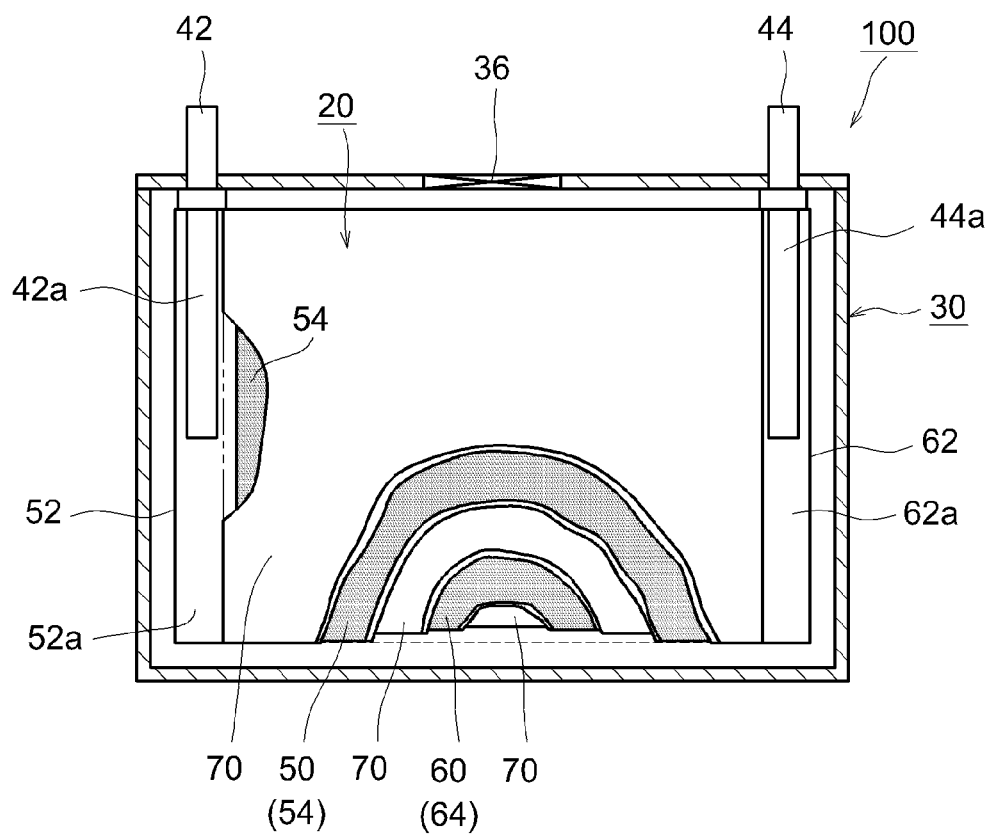
FIG. 1 is a cross-sectional diagram that schematically illustrates the internal structure of a lithium ion secondary battery according to an embodiment of the present disclosure.

The lithium ion secondary battery 100 shown in FIG. 1 is a sealed lithium ion secondary battery 100 constructed by housing a flat-shaped wound electrode assembly 20 and a nonaqueous electrolyte in a flat square battery case (in other words, an outer container) 30. The battery case 30 is provided with a positive electrode terminal 42 and a negative electrode terminal 44 for external connection and a thin safety valve 36 configured so as to release internal pressure of the battery case 30 when the internal pressure rises to or exceeds a prescribed level. The battery case 30 is also provided with an electrolyte injection port (not illustrated) for injecting the nonaqueous electrolyte. The positive electrode terminal 42 is electrically connected to a positive electrode current collecting plate 42a. The negative electrode terminal 44 is electrically connected to a negative electrode current collecting plate 44a. As a material of the battery case 30, for example, a lightweight metallic material with good thermal conductivity such as aluminum is used.

Figure 2:
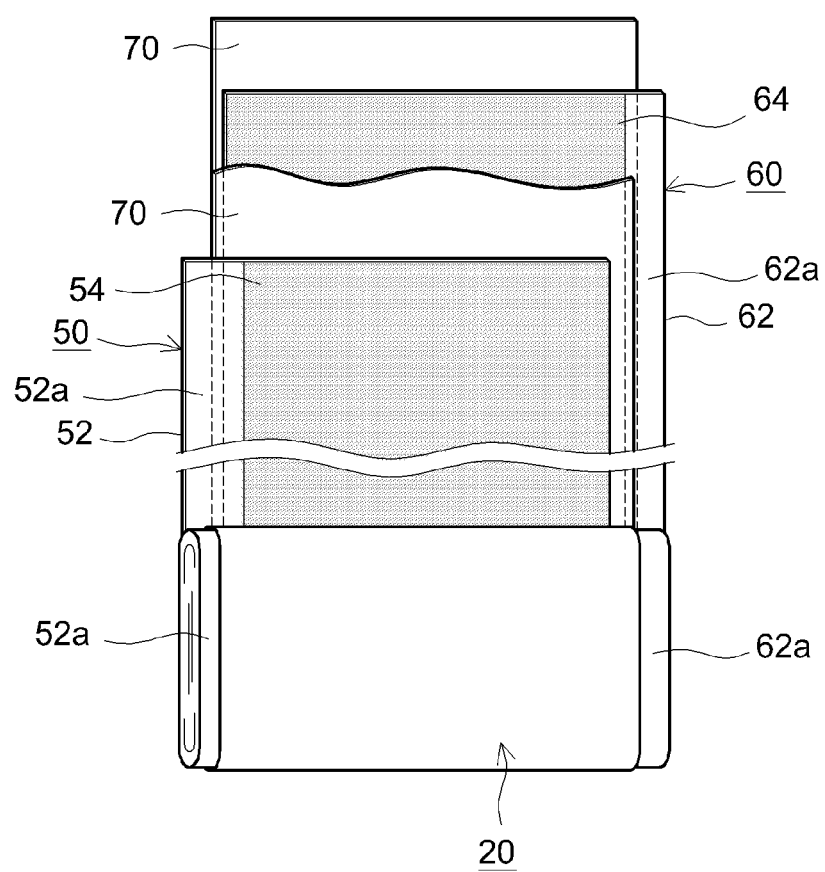
FIG. 2 is a schematic diagram that illustrates the structure of the wound electrode assembly of a lithium ion secondary battery according to an embodiment of the present disclosure.

As shown in FIGS. 1 and 2, the wound electrode assembly 20 has a form in which a positive electrode sheet 50 having a positive electrode active material layer 54 formed in a lengthwise direction on one surface or both surfaces (in this case, both surfaces) of an elongated positive electrode current collector 52 and a negative electrode sheet 60 having the negative electrode active material layer 64 formed in the lengthwise direction on one surface or both surfaces (in this case, both surfaces) of the elongated negative electrode current collector 62 are laminated via two elongated separator sheets 70 and wound in the lengthwise direction. The positive electrode current collecting plate 42a and the negative electrode current collecting plate 44a are respectively joined to a positive electrode active material layer unformed portion 52a (in other words, a portion where the positive electrode active material layer 54 has not been formed and the positive electrode current collector 52 is exposed) and a negative electrode active material layer unformed portion 62a (in other words, a portion where the negative electrode active material layer 64 has not been formed and the negative electrode current collector 62 is exposed) which are formed so as to protrude outward from both ends in a winding axis direction (in other words, a sheet width direction that is perpendicular to the lengthwise direction) of the wound electrode assembly 20.

The positive electrode current collector 52 constituting the positive electrode sheet 50 can be exemplified by aluminum foil and so forth.

The positive electrode active material layer 54 contains a lithium composite oxide having a layered structure as positive electrode active material.

The lithium composite oxide having a layered structure can be exemplified by lithium nickel-type composite oxides, lithium manganese-type composite oxides, lithium cobalt-type composite oxides, lithium nickel cobalt aluminum-type composite oxides, lithium iron nickel manganese-type composite oxides, and lithium nickel cobalt manganese-type composite oxides. Among these, lithium nickel cobalt manganese-type composite oxides provide better resistance characteristics and are thus desired.

In this Specification, "lithium nickel cobalt manganese-type composite oxide" is a term that encompasses oxides in which the constituent elements are Li, Ni, Co, Mn, and O, but that also encompasses oxides that contain, besides the aforementioned elements, one or two or more additional elements. These additional elements can be exemplified by transition metal elements and main group metal elements such as Mg, Ca, Al, Ti, V, Cr, Si, Y, Zr, Nb, Mo, Hf, Ta, W, Na, Fe, Zn, Sn, and so forth. The additional element may also be a metalloid element such as B, C, Si, P, and so forth, or a nonmetal element such as S, F, Cl, Br, I, and so forth. The content of these additional elements is desirably not more than 0.1 mol with respect to lithium. This likewise also applies to the aforementioned lithium nickel-type composite oxide, lithium cobalt-type composite oxide, lithium manganese-type composite oxide, lithium nickel cobalt aluminum-type composite oxide, and lithium iron nickel manganese-type composite oxide.

The lithium composite oxide having a layered structure is in the form of porous particles in the present embodiment. The porous particle is a particle that has at least two or more voids.

With regard to these voids, the porous particle has at least two voids each of which has the percentage of the void area with respect to the area occupied by the particle in the cross-sectional view of the particle of at least 1%.

The voids may or may not be open. When open, the individual void may have two or more openings.

It should be noted that the area occupied by the particle is the area, within the area of the overall particle captured in cross-sectional view, of the region in which the constituent material of the particle is present, and thus is equal to the area provided by subtracting the void regions from the area of the overall particle captured in cross-sectional view.

The cross section of the porous particle can be observed, for example, by acquisition of an electron microscopic cross-sectional image using, e.g., a scanning electron microscope (SEM), transmission electron microscope (TEM), and so forth. The percentage of the void area with respect to the area occupied by the particle can be determined from this electron microscopic cross-sectional image. When a void has an opening, the void does then not have a closed contour. In this case, the two edges of the opening are connected by a straight line and the area is calculated for the region bounded by the contour of the void and this straight line.

The porous particles used in the present embodiment are typically secondary particles in which primary particles are aggregated. Thus, for an ordinary porous particle that is a secondary particle in which primary particles are simply aggregated, the number of voids for which the percentage for the area of the void with respect to the area occupied by the particle of at least 1% is not more than 1 (and in particular is 0). Accordingly, in the present embodiment, a secondary particle is used typically in which the primary particles are loosely aggregated and as a result the voids are larger than normal.

In addition, with regard to the voids, the porous particle has a void that connect the particle interior to the surface and that has an opening. The opening has an opening diameter of at least 100 nm.

The presence/absence in a void having an opening with an opening diameter of at least 100 nm can be checked using the aforementioned electron microscopic cross-sectional image.

For the voids having an opening with an opening diameter of at least 100 nm, in cross-sectional view, the percentage of a void area with respect to the area occupied by the particle may be at least 1% or may be less than 1%, but at least 1% is desired.

From the standpoint of the mechanical strength of the porous particles and securing a satisfactory amount of internal voids, the average void ratio of the porous particles is desirably at least 10% and not more than 50% in the present embodiment. In addition, the percentage, in the porous particles, of particles having a void ratio of at least 10% and not more than 50% is desirably at least 80%. This provides a smaller resistance for the nonaqueous electrolyte secondary battery and provides a higher output.

It should be noted that the void ratio of the particle can be determined by acquiring the aforementioned electron microscopic cross-sectional image and calculating the percentage of the total area of the void regions with respect to the area of the particle as a whole (the sum of the area occupied by the particle and the total area of the void regions). The average void ratio of the porous particles is determined by calculating the average value of the void ratio for at least 100 particles. In addition, at least 100 particles are used to carry out the evaluation of whether the percentage of particles for which the void ratio is in the range from at least 10% to not more than 50% is at least 80%.

Figure 3:
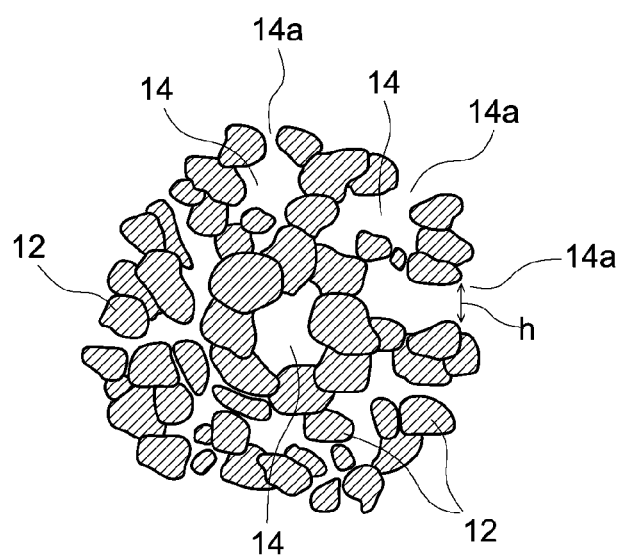
FIG. 3 is a cross-sectional diagram that schematically illustrates an example of a porous particle used in a lithium ion secondary battery according to an embodiment of the present disclosure.

A specific example of the structure of a porous particle is given in FIG. 3. FIG. 3 is a schematic cross-sectional diagram of an example of a porous particle. As shown in FIG. 3, the porous particle 10 is a secondary particle composed of aggregated primary particles 12. Because the primary particles are more loosely aggregated than normal, this secondary particle has relatively large voids 14. Some of the primary particles 12 are present in FIG. 3 in a detached form; however, this is due to the diagram being a cross-sectional diagram, and in actuality they are in contact with other primary particles (not shown) in regions outside the diagram.

In the example shown in the figure, there are two or more voids 14 for which the percentage of the area of the void with respect to the area occupied by the porous particle 10 (the total area occupied by all the particles 12) is at least 1%.

In addition, voids lacking an opening 14a, having one opening 14a, and having two or more openings 14a are present for the voids 14 in the example shown in the figure.

In addition, the voids 14 include voids that have an opening 14a having an opening diameter h of at least 100 nm.

Porous particles having such voids can be produced in accordance with known methods. In particular, the pore structure of the porous particles can be controlled by adjusting the conditions for producing a metal hydroxide that is a precursor of the lithium composite oxide by a crystallization method.

The average particle diameter (median diameter: D50) of the lithium composite oxide is not particularly limited, but, for example, is at least 0.1 μm and not more than 20 desirably at least 0.5 μm and not more than 15 and more desirably at least 3 μm and not more than 15 μm.

The average particle diameter (D50) can be determined, for example, using a laser diffraction/scattering method.

The porous particle is provided with a coating of lithium tungstate on its surface in the present embodiment.

The form of the lithium tungstate coating is not particularly limited. The lithium tungstate coating desirably partially coats the porous particle. More desirably, the lithium tungstate coating is granular and this granular coating is scattered on the porous particle surface.

The lithium tungstate constituting the coating is a composite oxide that contains lithium (Li) and tungsten (W). The atomic ratio between the lithium (Li) and tungsten (W) in the lithium tungstate is not particularly limited. The lithium tungstate can have, for example, the following compositions: $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, and $Li_{18}W_5O_{15}$.

The lithium tungstate desirably has the composition represented by $Li_pWO_q$ ($0.3 \leq p \leq 6.0$, $3.0 \leq q \leq 6.0$) and particularly desirably has the composition given by $Li_2WO_4$.

There are no particular limitations on the amount of the lithium tungstate coating. The amount of tungsten contained in the coating with respect to the lithium composite oxide, is desirably at least 0.05 mass % and not more than 2 mass % and is more desirably at least 0.25 mass % and not more than 1 mass %. The amount of tungsten with respect to the lithium composite oxide can be determined, for example, using ICP emission spectroscopic analysis.

In the present embodiment, desirably the lithium tungstate coating is granular and the average particle diameter of this granular coating is less than the average opening diameter of the openings of the voids in the porous particles. In this case, formation of the lithium tungstate coating in the porous particle interior is markedly promoted when the lithium tungstate coating is formed on the porous particle surface. As a result, an even lower resistance and higher output are established for the nonaqueous electrolyte secondary battery.

The average particle diameter of the granular coating can be determined, for example, by measuring a diameter of the coating (the length of the segment of contact between the coating and the lithium composite oxide) using the aforementioned electron microscopic cross-sectional image and taking the average value of at least 100 diameters of the coating. The average opening diameter of the openings of the voids in the porous particles can be determined, for example, by measuring the opening diameter of the opening of the void using the aforementioned electron microscopic cross-sectional image and taking the average value of the opening diameters of at least 100 openings.

The lithium tungstate coating can be formed according to known methods. For example, formation can be carried out by mixing the porous particles with tungsten oxide or lithium tungstate in the presence of an alcohol solvent having 1 to 4 carbons, e.g., ethanol, and removing the alcohol solvent by drying. Even though tungsten oxide is used as a starting material, Li present at the porous particle surface reacts with the tungsten oxide to convert it into lithium tungstate.

The resistance of the lithium ion secondary battery 100 can be reduced and its output can be increased by using, as the positive electrode active material, such a lithium composite oxide which has a layered structure, has a special porous structure and is provided with a lithium tungstate coating.

The reasons for this are thought to be as follows.

The lithium tungstate coating promotes conduction of the ion that functions as the charge carrier. The formation of the lithium tungstate coating in the interior is facilitated by means of the porous particles having relatively large voids as described above. Therefore, the lithium tungstate coating having an ion conduction-promoting action can be allowed to exist in a large amount on the surface of the porous particles including the interior surfaces, resulting in the appearance of a strong resistance-reducing effect.

In addition, the surface area of the lithium composite oxide that can be coated by the lithium tungstate is increased due to the special porous structure, and thus it is also possible to enhance the resistance-reducing effect further by increasing the amount of the coating.

The content of the positive electrode active material in the positive electrode active material layer 54 (that is, with respect to the total mass of the positive electrode active material layer 54) is not particularly limited, but is desirably at least 70 mass % and more desirably at least 80 mass %.

The positive electrode active material layer 54 may further contain, within a range in which the effects of the present disclosure are not impaired, a positive electrode active material other than the lithium composite oxide having a layered structure.

The positive electrode active material layer 54 can further contain components other than the positive electrode active material, for example, trilithium phosphate, a conductive material, a binder, and so forth. For example, carbon black, e.g., acetylene black (AB), as well as other carbon materials (for example, graphite) can be suitably used as the conductive material. For example, polyvinylidene fluoride (PVDF) and so forth can be used as the binder.

The content of trilithium phosphate in the positive electrode active material layer 54 is not particularly limited, but is desirably at least 1 mass % and not more than 15 mass % and is more desirably at least 2 mass % and not more than 12 mass %.

The content of the conductive material in the positive electrode active material layer 54 is not particularly limited, but is desirably at least 1 mass % and not more than 15 mass % and is more desirably at least 3 mass % and not more than 13 mass %.

The content of the binder in the positive electrode active material layer 54 is not particularly limited, but is desirably at least 1 mass % and not more than 15 mass % and is more desirably at least 1.5 mass % and not more than 10 mass %.

The negative electrode current collector 62 constituting the negative electrode sheet 60 can be exemplified by copper foil.

The negative electrode active material layer 64 contains a negative electrode active material. For example, a carbon material such as graphite, hard carbon, soft carbon, and so forth may be used as this negative electrode active material. The graphite may be a natural graphite or an artificial graphite and may be an amorphous carbon-coated graphite in which graphite is coated with an amorphous carbon material. The negative electrode active material layer 64 may contain components other than the active material, for example, a binder, a thickener, and so forth. For example, styrene-butadiene rubber (SBR), polyvinylidene fluoride (PVDF), and so forth may be used for the binder. For example, carboxymethyl cellulose (CMC), and so forth may be used for the thickener.

The content of the negative electrode active material in the negative electrode active material layer 64 is desirably at least 90 mass % and is more desirably at least 95 mass % and not more than 99 mass %. The content of the binder in the negative electrode active material layer 64 is desirably at least 0.1 mass % and not more than 8 mass % and is more desirably at least 0.5 mass % and not more than 3 mass %. The content of the thickener in the negative electrode active material layer 64 is desirably at least 0.3 mass % and not more than 3 mass % and is more desirably at least 0.5 mass % and not more than 2 mass %.

The separator 70 can be exemplified by a porous sheet (film) composed of a resin such as polyethylene (PE), polypropylene (PP), polyester, cellulose, polyamide, and so forth. This porous sheet may have a single-layer structure or may have a laminated structure of two or more layers (for example, a trilayer structure in which a PP layer is laminated on both sides of a PE layer). A heat-resistant layer (HRL) may be disposed on the surface of the separator 70.

The nonaqueous electrolyte typically contains a nonaqueous solvent and a supporting electrolyte.

The organic solvents, e.g., the various carbonates, ethers, esters, nitriles, sulfones, lactones, and so forth, that are used in the electrolyte solutions of ordinary lithium ion secondary batteries can be used without particular limitation as the nonaqueous solvent. The following are specific examples: ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). A single such nonaqueous solvent may be used by itself or a suitable combination of two or more may be used.

For example, a lithium salt such as $LiPF_6$, $LiBF_4$, and lithium bis(fluorosulfonyl)imide (LiFSI) (desirably $LiPF_6$) can be suitably used as the supporting electrolyte. The concentration of the supporting electrolyte is desirably from 0.7 mol/L to 1.3 mol/L.

The nonaqueous electrolyte may contain—insofar as the effects of the present disclosure are not significantly impaired—components other than the components described in the preceding, for example, various additives such as thickeners and gas generators such as biphenyl (BP) and cyclohexylbenzene (CHB).

The lithium ion secondary battery 100 constituted as described in the preceding has a low resistance. This lithium ion secondary battery 100 therefore has excellent output characteristics.

The lithium ion secondary battery 100 can be used in a variety of applications. An advantageous application is as a drive power source mounted in a vehicle, e.g., an electric automobile (EV), hybrid automobile (HV), plug-in hybrid automobile (PHV), and so forth. The lithium-ion secondary battery 100 may also be used in the form of a battery pack typically formed by connecting a plurality of the lithium-ion secondary batteries 100 in series and/or in parallel.

A rectangular lithium ion secondary battery 100 provided with a flat wound electrode assembly 20 has been described as an example. However, the herein disclosed nonaqueous electrolyte secondary battery may also be constructed as a lithium ion secondary battery provided with a stacked-type electrode assembly. The herein disclosed nonaqueous electrolyte secondary battery may also be constructed as a cylindrical lithium ion secondary battery or a laminate-type lithium ion secondary battery. The herein disclosed nonaqueous electrolyte secondary battery may also be constructed as a nonaqueous electrolyte secondary battery other than a lithium ion secondary battery.

Examples in accordance with the present disclosure are described below, but this is not intended to limit the present disclosure to the description in these examples.

Examples 1

Production of Positive Electrode Active Material

A starting material aqueous solution containing nickel sulfate, cobalt sulfate, and manganese sulfate in a molar ratio of 1:1:1 was prepared. On the other hand, a reaction solution with a pH adjusted using sulfuric acid and aqueous ammonia was prepared in a reactor. A pH adjustment solution was also prepared by mixing an aqueous sodium carbonate solution and an aqueous ammonium carbonate solution.

While adjusting the pH using the pH adjustment solution, the starting material aqueous solution was added at a prescribed rate to the reaction solution under stirring. Crystallization was completed after the passage of a prescribed period of time. The crystallized material was washed with water and was then filtered and dried to obtain precursor particles that were porous hydroxide particles.

The obtained precursor particles and lithium carbonate were mixed so as to provide 1:1 for the molar ratio of lithium to the total of the nickel, cobalt, and manganese. This mixture was fired for 10 hours at 950° C. to obtain a lithium composite oxide having a layered structure ($LiNi_{1/3}Co_{1/3}Mn_{1/3}O_2$) in the form of porous particles.

The resulting lithium composite oxide was mixed in the presence of ethanol with lithium tungstate (LWO) having a particle diameter of 0.5 μm. The LWO was mixed in an amount that provided 0.5 mass % for the amount of the tungsten in the LWO with respect to the lithium composite oxide. The ethanol was removed from this mixture by drying to obtain a lithium tungstate-coated lithium composite oxide that was a positive electrode active material.

Fabrication of Lithium Ion Secondary Batteries for Evaluation

The positive electrode active material produced as described above, acetylene black (AB) as conductive material, and polyvinylidene fluoride (PVDF) as binder were mixed in N-methylpyrrolidone (NMP) at a mass ratio of positive electrode active material:AB:PVDF=94:3:3 to produce a positive electrode active material layer-forming paste. This paste was coated on both sides of a 15 μm-thick aluminum foil followed by drying and then pressing to produce a positive electrode sheet.

Natural graphite (C) as the negative electrode active material, styrene-butadiene rubber (SBR) as binder, and carboxymethyl cellulose (CMC) as thickener were mixed in deionized water at a mass ratio of C:SBR:CMC=98:1:1 to prepare a paste for forming a negative electrode active material layer. This paste was coated on both sides of 10 μm-thick copper foil and dried and was thereafter pressed to fabricate a negative electrode sheet.

For the separator sheet, two 20 μm-thick porous polyolefin sheets having a PP/PE/PP trilayer structure were prepared.

The thusly fabricated positive electrode sheet and negative electrode sheet and the two prepared separator sheets were stacked and wound to produce a wound electrode assembly. The respective electrode terminals were attached by welding to the positive electrode sheet and negative electrode sheet of the resulting wound electrode assembly, and this was housed in a battery case that had an injection port.

A nonaqueous electrolyte solution was then filled through the injection port of the battery case, and this injection port was sealed airtight. As the nonaqueous electrolyte solution, a the nonaqueous electrolyte solution prepared by dissolving $LiPF_6$ as a supporting electrolyte at a concentration of 1.0 mol/L into a mixed solvent containing ethylene carbonate (EC), dimethyl carbonate (DMC), and ethyl methyl carbonate (EMC) at a volume ratio of EC:DMC:EMC=3:4:3 was used.

The procedure described above yielded lithium ion secondary batteries for evaluation having a capacity of 5 Ah.

Comparative Example 1

A lithium ion secondary battery for evaluation was produced by the same method as Example 1 using the lithium composite oxide produced by the same method as Example 1 as the positive electrode active material. Thus, the positive electrode active material is not coated with lithium tungstate (LWO).

Comparative Example 2 and Examples 2 to 7

Positive electrode active materials were produced using the same method as in Example 1. However, positive electrode active materials having different porous structures were obtained by changing the porous structure of the precursor particles by varying the rate of addition of the starting material aqueous solution, the pH, the stirring rate, and the reaction time during production of the precursor particles.

These positive electrode active materials were used to fabricate, by the same method as in Example 1, lithium ion secondary batteries for evaluation.

Comparative Examples 3 and 4

Lithium electrode active materials with a hollow structure having one large void were obtained by the same method as in Example 1, except that the ammonium ion concentration was lowered and the precursor precipitation rate was raised during production of the precursor particles.

These positive electrode active materials were used to fabricate, by the same method as in Example 1, lithium ion secondary batteries for evaluation.

Comparative Example 5

A positive electrode active material was prepared by the same method as in Example 1, except that the reaction time was lengthened in production of the precursor particles.

This positive electrode active material was used to fabricate, by the same method as in Example 1, a lithium ion secondary battery for evaluation.

Examples 8 to 14

Positive electrode active materials were produced by the same method as in Example 1. However, the porous structure of the precursor particles was changed by varying the rate of addition of the starting material aqueous solution, the pH, the stirring rate, and the reaction time during production of the precursor particles. In addition, the particle diameter of the lithium tungstate coating was altered by varying the particle diameter of the tungsten oxide used during coating formation on the obtained lithium composite oxide. Positive electrode active materials were obtained proceeding in this manner.

These positive electrode active materials were used to fabricate, by the same method as in Example 1, lithium ion secondary batteries for evaluation.

Evaluation of the Structure of the Positive Electrode Active Material

SEM cross-sectional images of the positive electrode active materials produced as described above were acquired. Using these SEM cross-sectional imaged, a count was made of the number of voids, present in a single particle, for which the percentage of the area of the void with respect to the area occupied by the particle was at least 1%.

In addition, the presence/absence of voids having an opening with an opening diameter of at least 100 nm was checked by measuring the opening diameter on the voids that communicated from the interior to the surface and were open. The opening diameter was also measured on 100 void openings and its average value was determined.

In addition, the void ratio was determined by calculating, for 100 particles, the percentage of the total area of the void regions with respect to the area of the particle as a whole. Calculation of the average value for this gave the average void ratio.

The number of particles having a void ratio of at least 10% and not more than 50% in these 100 particles was also counted and the percentage for this was determined.

Except for Comparative Example 1, it was confirmed that a granular lithium tungstate coating was scattered on the outer surface and inner surface of the lithium composite oxides. The particle diameter of the lithium tungstate coating was measured. The measurement was performed on 100 of the coatings and the average value was calculated.

Measurement of the Battery Resistance

Each of the lithium ion secondary batteries for evaluation was subjected to an activation treatment, followed by adjustment to a state of a 50% SOC. Then, under an environment with a temperature of 25° C., the battery was subjected to constant-current discharge for 10 seconds at a rate of 100 Ah and the voltage drop was measured. The battery resistance was calculated by dividing this voltage drop by the discharge current value. Based on the resistance value in Comparative Example 1 as 100, the ratio of the resistance value was determined for the examples and the other comparative examples. The results are given in the tables.

TABLE 1

|  | number of voids with an area percentage of at least 1% | openings with an opening diameter of at least 100 nm | LWO coating | resistance ratio |
|---|---|---|---|---|
| Example 1 | ≥2 | present | present | 70 |
| Comparative Example 1 | ≥2 | present | absent | 100 |
| Comparative Example 2 | ≥2 | absent | present | 100 |
| Comparative Example 3 | 1 | absent | present | 105 |
| Comparative Example 4 | 1 | present | present | 102 |
| Comparative Example 5 | 0 | absent | present | 100 |

TABLE 2

|  | number of voids with an area percentage of at least 1% | openings with an opening diameter of at least 100 nm | LWO coating | percentage of particles having a void ratio of at least 10% and not more than 50% (%) | average void ratio (%) | resistance ratio |
|---|---|---|---|---|---|---|
| Example 1 | ≥2 | present | present | 70 | 25 | 70 |
| Example 2 | ≥2 | present | present | 80 | 25 | 62 |
| Example 3 | ≥2 | present | present | >90 | 25 | 60 |
| Example 4 | ≥2 | present | present | 80 | 8 | 70 |
| Example 5 | ≥2 | present | present | 80 | 10 | 67 |
| Example 6 | ≥2 | present | present | 80 | 50 | 62 |
| Example 7 | ≥2 | present | present | 80 | 60 | 70 |
| Comp. Ex. 1 | ≥2 | present | absent | 80 | 25 | 100 |

TABLE 3

|  | number of voids with an area percentage of at least 1% | openings with an opening diameter of at least 100 nm | LWO coating | percentage of particles having a void ratio of at least 10% and not more than 50% (%) | average void ratio (%) | average opening diameter of voids (μm) | average particle diameter of coating (μm) | resistance ratio |
|---|---|---|---|---|---|---|---|---|
| Example 3 | ≥2 | present | present | >90 | 25 | 0.2 | 0.5 | 60 |
| Example 8 | ≥2 | present | present | >90 | 25 | 0.2 | 0.2 | 60 |
| Example 9 | ≥2 | present | present | >90 | 25 | 0.2 | 0.1 | 50 |
| Example 10 | ≥2 | present | present | >90 | 25 | 0.2 | 0.05 | 48 |
| Example 11 | ≥2 | present | present | >90 | 40 | 1 | 1.2 | 62 |
| Example 12 | ≥2 | present | present | >90 | 40 | 1 | 1 | 62 |
| Example 13 | ≥2 | present | present | >90 | 40 | 1 | 0.8 | 55 |
| Example 14 | ≥2 | present | present | 80 | 50 | 1 | 0.5 | 50 |
| Comp. Ex. 1 | ≥2 | present | absent | 80 | 25 | 0.2 | — | 100 |

The results in Table 1 to Table 3 demonstrate that the battery resistance is low when the lithium composite oxide having a layered structure is in the form of porous particles, has in the cross-sectional view thereof at least two voids for which the percentage of the area of the void with respect to the area occupied by the particle is at least 1%, has a void with an opening diameter of at least 100 nm, and is provided with a coating of lithium tungstate on its surface.

Accordingly, it is demonstrated that the herein disclosed nonaqueous electrolyte secondary battery can provide a nonaqueous electrolyte secondary battery with a low resistance.

The results in Table 2 also demonstrate that the battery resistance is particularly low when the average void ratio of the porous particles is at least 10% and not more than 50% and the percentage of particles having a void ratio of at least 10% and not more than 50% in the porous particles is at least 80%.

The results in Table 3 further demonstrate that the battery resistance is particularly low when the lithium tungstate coating is granular and the granular coating has an average particle diameter smaller than the average opening diameter of the openings of the voids in the porous particles.

Specific examples of the present disclosure have been described in detail in the preceding, but these are nothing more than examples and do not limit the claims. The art disclosed in the claims includes various modifications and alterations to the specific examples provided as examples in the preceding.

What is claimed is:

1. A nonaqueous electrolyte secondary battery, comprising:
    a positive electrode;
    a negative electrode; and
    a nonaqueous electrolyte, wherein
    the positive electrode includes a positive electrode active material layer,
    the positive electrode active material layer contains a lithium composite oxide having a layered structure as a positive electrode active material,
    the lithium composite oxide is in a form of porous particles,
    each of the porous particles has a plurality of voids, wherein
        at least two voids of the plurality of voids each has a percentage of void area with respect to an area occupied by each of the particles in a cross-sectional view thereof of at least 1%, and
        at least one void of the plurality of voids connects an interior of each of the particles to a surface thereof and has an opening,
    the opening has an opening diameter of at least 100 nm,
    the porous particles have an average void ratio of at least 10% and not more than 50%, and a percentage of particles having a void ratio of at least 10% and not more than 50% in the porous particles is at least 80%, and
    each of the porous particles is provided with a coating of lithium tungstate on a surface thereof.

2. The nonaqueous electrolyte secondary battery according to claim 1, wherein a percentage of particles having a void ratio of at least 10% and not more than 50% in the porous particles is at least 90%.

3. The nonaqueous electrolyte secondary battery according to claim 1, wherein the lithium tungstate coating is granular, forming a granular coating on the porous particles, and the granular coating has an average particle diameter smaller than an average opening diameter of the opening of the void in the porous particles.

4. The nonaqueous electrolyte secondary battery according to claim 1, wherein the lithium composite oxide is a lithium nickel cobalt manganese-type composite oxide.

* * * * *